J. H. PARKIN.
PULVERIZING IMPLEMENT FOR THE TREATMENT OF FALLOW AND OTHER LAND.
APPLICATION FILED AUG. 28, 1912.

1,100,395. Patented June 16, 1914.

Witnesses:
Gertrude M. Hulst
E. B. Anderson.

Inventor:
James Henry Parkin
per Lawrence Langner
Attorney.

COLUMBIA PLANOGRAPH CO., WASHINGTON, D. C.

UNITED STATES PATENT OFFICE.

JAMES HENRY PARKIN, OF NHILL, VICTORIA, AUSTRALIA.

PULVERIZING IMPLEMENT FOR THE TREATMENT OF FALLOW AND OTHER LAND.

1,100,395.

Specification of Letters Patent. Patented June 16, 1914.

Application filed August 28, 1912. Serial No. 717,561.

*To all whom it may concern:*

Be it known that I, JAMES HENRY PARKIN, a citizen of the Commonwealth of Australia, residing at Macpherson street, Nhill, in the State of Victoria and said Commonwealth, have invented new and useful Improvements in Pulverizing Implements for the Treatment of Fallow and other Land, of which the following is a specification.

The object of this invention is to provide an implement by means of which the surface of fallow or like land which has been left in a lumpy condition may be reduced or pulverized to a comparatively even surface.

The invention consists essentially of a frame upon wheels, and a roller or other suitable device equipped with teeth hung in suitable brackets from said frame and having a rotary movement imparted to it by means of a chain drive gearing or other driving means from either or both of the drive wheels of the supporting frame. These drive wheels are preferably provided with wide grooved tires, or they may be otherwise fitted or formed with suitable gripping devices around the tread thereof.

The motion of the rotating device will be in the direction of travel of the implement and said rotating device may be given any desired speed of rotation by using different sized gears, chain wheels, or clutch devices as will be readily understood.

The spiked roller or other tooth carrying device or frame may be supported in brackets depending from the main frame of the implement, and may be raised or lowered by means of a lever or quadrant, a worm gear, or any other suitable raising or lowering device in order to regulate the working depth of the teeth.

In order that the invention may be more readily understood, it will now be described with reference to the accompanying sheet of drawings, in which—

Figure 1:
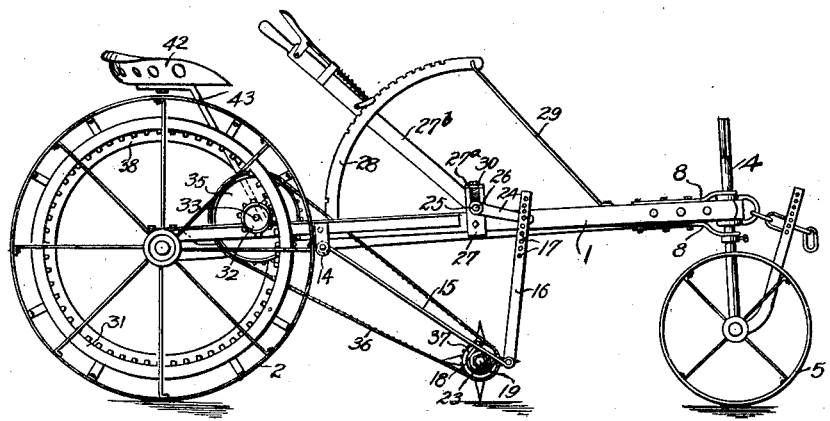
Figure 2:
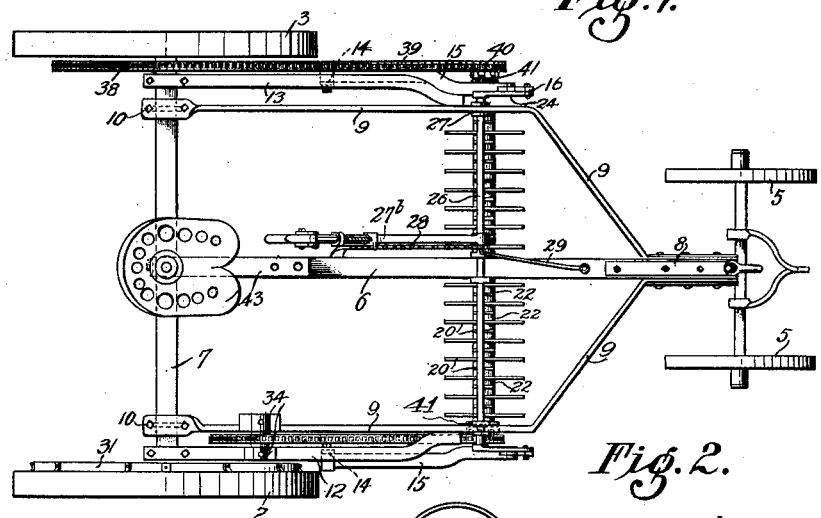
Figures 5, 6:
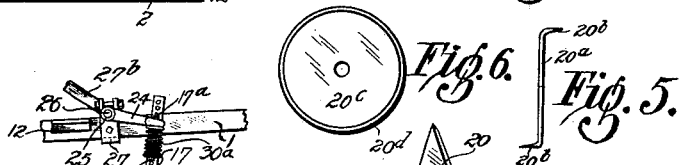
Figures 3, 4:
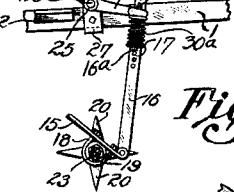
Figure 7:

Figure 1 is a view in side elevation, and Fig. 2 is a view in plan of the improved pulverizing implement. Fig. 3 is a side elevation of a portion of the machine illustrating a modification of the invention. Fig. 4 is a view in perspective of the teeth or pulverizers forming a part of the invention. Fig. 5 is an end elevation of a modified construction of the teeth or tines. Fig. 6 is a side elevation of a disk formed with a suitable edge and comprising an alternative construction of pulverizer. Fig. 7 is a detail view in side elevation of a modification embodied in this invention.

Like reference numerals indicate the same or corresponding parts in all the figures.

According to this invention a frame 1 is mounted upon the main traveling wheels 2, 3, and the standard or post 4 of the front steering wheels 5. The frame 1 and the steering wheels 5 are fitted with suitable draft appliances.

The frame 1 consists of a longitudinal central beam 6 connecting at its rear end the main axle 7, its forward end connecting the standard 4 of the steering wheels 5 by the clamping plates 8. Side bars 9 are bolted to the forward end of the main beam 6 and extend outwardly and then longitudinally to each end of the axle 7 to which they are clamped by U bolts 10 or other fastening devices. Bearing plates 12 and 13 preferably of angle iron are mounted at their forward ends to the outside of the bars 10 and extend inside the wheels 2, 3, to the axle 7, being fitted thereto by U bolts or other clamping devices.

A bracket 14 is fitted to the plates 12, 13 forwardly of the wheels 2 and 3 and a bar 15 is hinged or otherwise pivotally mounted thereto. The bars 15 extend diagonally toward the front of the machine and at their outer ends are hinged or otherwise pivotally mounted to the upwardly projecting rods 16 the upper ends of which are provided with a series of openings 17. At the lower ends of the bars 15 and on the under-side thereof U bolts 18 are fitted adapted to form or accommodate bearings for a roller or spindle 19. Upon this spindle 19 are mounted a series of double ended teeth or tines 20 tapering to a point at either end and provided with an annular or squared opening 21 to receive the spindle 19, a greater portion of the length of which is round or square in cross section. Any number of these teeth or tines may be used arranged at varying angles if desired and distanced along the spindle 19 by washers or distance pieces 22 according to requirements. The teeth are tightly clamped to the spindle 19 by nuts 23 at each end of the spindle or by other suitable clamping means. Alternatively the teeth or tines may be constructed as illustrated in Fig. 5 the tine 20ª having its ends 20ᵇ bent or rounded at right angles. These ends 20ᵇ are sharpened on their cutting side to destroy weeds and rubbish when in operation.

In the modification illustrated in Fig. 6 disks 20ᶜ having a suitable edge 20ᵈ are employed in lieu of the tines or teeth 20 or 20ª. These disks 20ᶜ are fitted to the implement similarly to the teeth or tines above described.

An arm 24 is adapted to be adjusted in the openings 17 of each of the rods 16 thus gaging the working depth of the teeth or tines 20. The opposite end 25 of each of the arms 24 is fitted to each end of a transverse spindle 26 mounted in brackets 27 fitted to the bars 9 of the frame 1. The brackets 27 are provided with a long vertical slot 27ª allowing the spindle 26 to slide vertically therein. This spindle 26 is fitted approximately at its center with a lever 27ᵇ locking within a quadrant rack 28. This rack 28 is fitted at its lower end to the beam 6 while its upper end connects a rod 29 fitted to the forward end of the main beam 6.

The teeth or tines 20 are preferably spring controlled so that, should they strike any obstruction, they will rise to the same but will return to their normal position on passing over the obstruction. To allow of this jump action a spring 30 is mounted above the transverse spindle 26 and at either end thereof, being held in the brackets 27 by a plate or in any other suitable manner. Alternatively the jump action is obtained as illustrated in Fig. 3. The arm 24 is provided with an enlarged head formed with an annular hole through which the rod 16 is adapted to slide and the downward travel of the rod 16 is controlled by a pin 17ª engaging the openings 17. Bearing on the underside of the arm 24 and around the rod 16 is a helical spring 30ª adjusted by a pin 16ª passing through the openings 17. The strength of the spring 30ª may be adjusted as will be readily understood.

Fig. 7 illustrates the construction of the brackets 27 when a jump action is not necessary, the use of the springs 30 is obviated, and no provision need be made for the spindle 26 to slide vertically in the brackets 27, the slots 27ª being of short length, and the spindle 26 is loosely held within the brackets 27 by bolts or the like as illustrated.

The implement is preferably driven at variable speeds. The near traveling wheel 2 is fitted with a crown wheel 31 having a pinion 32 gearing therewith. This pinion 32 is fitted to a spindle 33 mounted in bearings 34 to the bars 9 and 12 of the frame. A sprocket wheel 35 is fitted to this spindle between the bars 9 and 12 and carries a chain 36 extending around another sprocket 37 fitted to the near end of the tooth spindle 19.

Inside the off wheel 3 and mounted upon the axle 7 is a sprocket wheel 38 of large diameter carrying a chain 39 passing around another sprocket 40 on the tooth spindle 19. This spindle 19 is provided with a suitable clutch 41 at each end, in order that the required gear may be brought into action and rotate the teeth in the direction of the travel of the implement, one gear being driven from the axle 7 and the other from the near traveling wheel 2.

It will be readily understood that the teeth or pulverizers may be suspended from the rear of the traveling wheels 2, 3, if desired without departing from the spirit and scope of the invention.

A seat 42 is attached to a suitable standard 43 fitted to the beam 6, and the lever 27 is in a position convenient to the driver.

It will be readily understood that the disks, teeth, or tines 20 may be formed on the roller 19 if desired.

The roller or teeth carrying frame does not come into contact with the ground but only the disks, teeth or tines, the adjustment of the working depth thereof being controlled by the lever 27ᵇ. There is no clogging or choking of the implement as anything picked up by the disks, teeth, or tines is to a certain extent thrown off by centrifugal action and owing to the speed of rotation of the toothed roller the teeth need not be set close together and are therefore not liable to be choked up.

An implement constructed as herein described is simple in construction, light in draft, and will effectively pulverize or break down lumpy ground and form a fine and even surface.

Having now fully described and ascertained my said invention and the manner in which it is to be performed, I declare that what I claim is:—

1. A pulverizing implement comprising in combination with the drive wheels and frame, a spindle having a pulverizing surface, means for imparting a rotary motion thereto, and means for varying the speed of said spindle relatively to the drive wheels consisting of a flexible transmission from a pinion gearing with a crown wheel fitted to one of the driving wheels, clutch mechanism for connecting said transmission to said spindle, a sprocket wheel on the other of said driving wheels, a flexible connection from said sprocket to said spindle, and means for clutching the said second mentioned transmission to said spindle, substantially as described.

2. A machine, comprising a frame, a pair of driving wheels, a spindle, a pulverizing surface on said spindle, a crown wheel fitted to one of said driving wheels, a pinion gearing with said crown wheel, a flexible transmission from said pinion, clutch mechanism for connecting said transmission to said spindle, a sprocket wheel on the other of said driving wheels, a flexible connection from said sprocket to said spindle, and means for clutching said second mentioned transmission to said spindle, substantially as described.

In witness whereof I have hereunto set my hand in the presence of two witnesses.

JAMES HENRY PARKIN.

Witnesses:
SIDNEY HENDLEY,
ANNIE EDWARDS.

Copies of this patent may be obtained for five cents each, by addressing the "Commissioner of Patents, Washington, D. C."